(12) United States Patent  
Okada et al.

(10) Patent No.: US 6,999,005 B2  
(45) Date of Patent: Feb. 14, 2006

(54) IMAGE COMPENSATION APPARATUS

(75) Inventors: Hiroshi Okada, Tokyo (JP); Shuichi Yokokura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/792,129

(22) Filed: Mar. 4, 2004

(65) Prior Publication Data

US 2004/0174453 A1   Sep. 9, 2004

(30) Foreign Application Priority Data

Mar. 5, 2003 (JP) .................. P. 2003-057990

(51) Int. Cl.  
  *G08B 23/00* (2006.01)
(52) U.S. Cl. .................. 340/967; 396/7; 396/13
(58) Field of Classification Search ............. 340/967; 396/7, 8, 13; 348/144, 146; 359/554, 555  
See application file for complete search history.

(56) References Cited

U.S. PATENT DOCUMENTS

| | | | | |
|---|---|---|---|---|
| 3,744,387 A | * | 7/1973 | Fuller | 396/8 |
| 5,414,521 A | * | 5/1995 | Ansley | 348/123 |
| 5,523,887 A | * | 6/1996 | Wight | 359/556 |
| 6,088,055 A | * | 7/2000 | Lareau et al. | 348/113 |
| 6,130,705 A | * | 10/2000 | Lareau et al. | 348/144 |
| 6,477,326 B1 | * | 11/2002 | Partynski et al. | 396/7 |

FOREIGN PATENT DOCUMENTS

| | | |
|---|---|---|
| JP | 5-167901 | 7/1993 |
| JP | 2001-344597 | 12/2001 |

\* cited by examiner

*Primary Examiner*—John Tweel, Jr.  
(74) *Attorney, Agent, or Firm*—McGinn IP Law Group, PLLC

(57) ABSTRACT

In an image compensation apparatus for controlling an attitude of an image pickup section capable of rotating around mutually orthogonal three axes, the apparatus comprises a sight line direction information detection section for detecting information about a sight line direction of a pilot, a driving section which outputs a driving signal for rotating and driving the image pickup section with reference to the information about the sight line direction and rotates and drives the image pickup section based on this driving signal, an image pickup attitude information detection section for detecting information about an attitude of the image pickup section, an aircraft attitude information detection section for detecting information about an attitude of an aircraft, and a correction section for correcting the driving signal with reference to the information about the attitude of the image pickup section and the information about the attitude of the aircraft.

4 Claims, 2 Drawing Sheets

IMAGE COMPENSATION APPARATUS

BACKGROUND OF THE INVENTION

The present invention relates to an image compensation apparatus, and particularly to an image compensation apparatus for compensating an attitude of image pickup section capable of rotating around three axes (roll axis, pitch axis and yaw axis).

In recent years, a technique for assisting pilot control by acquiring image information about the outside world in flight by a predetermined image pickup device and generating outside world video based on this image information and displaying the generated outside world video on a predetermined display is proposed and commercialized.

For example, a technique in which a video camera (for example, see patent reference 1) mounted in a gyroscopic driving device capable of rotating around mutually orthogonal three axes and arbitrarily changing an image pickup direction is attached with an outside of aircraft is proposed. When such a gyroscopic driving device is adopted, even in case that the aircraft encounters gust, outside world video is maintained in a stable state by gyro stabilizing effect.

On the other hand, in the case of controlling an aircraft, a technique for providing outside world video (image information) which changes in response to movement of a head or a sight line of a pilot while properly showing an inclination of the horizon or a flight direction as well as the stable outside world video described above is required.

As the technique for providing such image information, a system (hereinafter called "an enhanced vision system") in which a small display (Head Mounted Display: hereinafter called "HMD")is mounted on a head of a pilot and also a camera is installed on an aircraft through a predetermined driving device and a sight line direction of the pilot is detected by measuring movement of the head of the pilot and the camera is driven according to the detected sight line direction is proposed (for example, see patent reference 2).

[Patent Reference 1]
JP-A-5-167901 (Page 2, FIG. 2)

[Patent Reference 2]
JP-A-2001-344597 (Page 1, FIG. 1)

However, the driving device used in the image information providing system as described above has a structure in which a camera can be rotated only around two axes (pitch axis and yaw axis), so that a pilot (or a co-pilot) visually identifying image information provided by this system may have physiological discomfort.

For example, when an aircraft moves to pitching direction in a state in which a pilot turns toward the side temporarily and thereby a camera rotates around a yaw axis, the image information is displayed as if the aircraft had performed roll movement. On the other hand, since the aircraft actually does not perform the roll movement, the pilot feels that the aircraft performs the pitching movement by vestibular organs made of semicircular canals and ear stones. As a result of this, a contradiction between image information obtained from eyes by the pilot and space information obtained from the vestibular organs arises, so that the pilot tends to get travel-sick.

Such a phenomenon becomes remarkable in the case that the pilot cannot see the outside at all or in the case that it is difficult for the pilot to see the outside (for example, at the time of night or bad weather conditions in the case of using a see-through visual display system).

SUMMARY OF THE INVENTION

An object of the invention is to solve physiological discomfort of a pilot caused by a contradiction between image information obtained from eyes by the pilot and space information obtained from another organ in an image compensation apparatus for controlling an attitude of image pickup section used in an image information providing system of an aircraft.

In order to solve the object, the invention as claimed in aspect 1 is characterized in that in an image compensation apparatus for controlling an attitude of image pickup section which is mounted in an aircraft and can rotate around a roll axis, a pitch axis and a yaw axis, the apparatus comprises sight line direction information detection section for detecting information about a sight line direction of a pilot, driving section which outputs a driving signal for rotating and driving the image pickup section with reference to the information about the sight line direction and rotates and drives the image pickup section based on this driving signal, image pickup attitude information detection section for detecting information about an attitude of the image pickup section, aircraft attitude information detection section for detecting information about an attitude of the aircraft, and correction section for correcting the driving signal with reference to the information about the attitude of the image pickup section and the information about the attitude of the aircraft.

According to the invention as claimed in aspect 1, by the correction section, the driving signal for rotating and driving the image pickup section can be corrected with reference to the information about the attitude of the image pickup section detected by the image pickup attitude information detection section and the information about the attitude of the aircraft detected by the aircraft attitude information detection section.

For example, when an aircraft performs pitching movement in a state in which a pilot turns toward the side temporarily and thereby the image pickup section rotates around a yaw axis and the image pickup section shifts sideward, a driving signal for rotating and driving the image pickup section around a roll axis can be corrected based on the information about the attitude of the image pickup section (yaw angle information about the image pickup section) and the information about the attitude of the aircraft (pitch angle information about the aircraft). Therefore, even when the aircraft performs the pitching movement, image information in which the roll axis hardly moves can be displayed. As a result of this, a contradiction between image information obtained from eyes by the pilot and space information obtained from vestibular organs can be solved, so that the pilot can be prevented from getting travel-sick.

The invention as claimed in aspect 2 is characterized in that in the image compensation apparatus as claimed in aspect 1, the image pickup section is a stereo camera constructed of two cameras placed at a predetermined spacing.

The invention as claimed in aspect 3 is characterized in that in the image compensation apparatus as claimed in aspect 1 or 2, the information about the attitude of the image pickup section is yaw angle information about the image pickup section and the information about the attitude of the aircraft is pitch angle information about an aircraft and the correction section corrects a driving signal for rotating and driving the image pickup section around a roll axis.

The invention as claimed in aspect 4 is characterized in that in the image compensation apparatus as claimed in any one of aspects 1 to 3, there is provided driving prevention section for preventing rotation and driving of the image pickup section when the information about the sight line direction does not reach a predetermined level.

According to the invention as claimed in aspect 4, there is provided driving prevention section for preventing rotation and driving of the image pickup section when the information about the sight line direction does not reach a predetermined level, so that when a pilot does not desire a change in image information, a situation in which the image pickup section rotates and the image information changes due to small movement of an aircraft or the pilot can be prevented. Therefore, stable image information can be provided for the pilot, so that the pilot does not have physiological discomfort.

DETAILED DESCRIPTION OF THE PREFERRED EMBODIMENTS

An embodiment of the invention will be described below in detail based on the drawings. An image compensation apparatus used in an image information providing system of an aircraft will be described in the embodiment. Incidentally, the image information providing system comprises an HMD mounted on a head of a pilot and a stereo camera mounted in an aircraft, and the image compensation apparatus according to the embodiment functions so as to control an attitude of the stereo camera.

Figure 1:
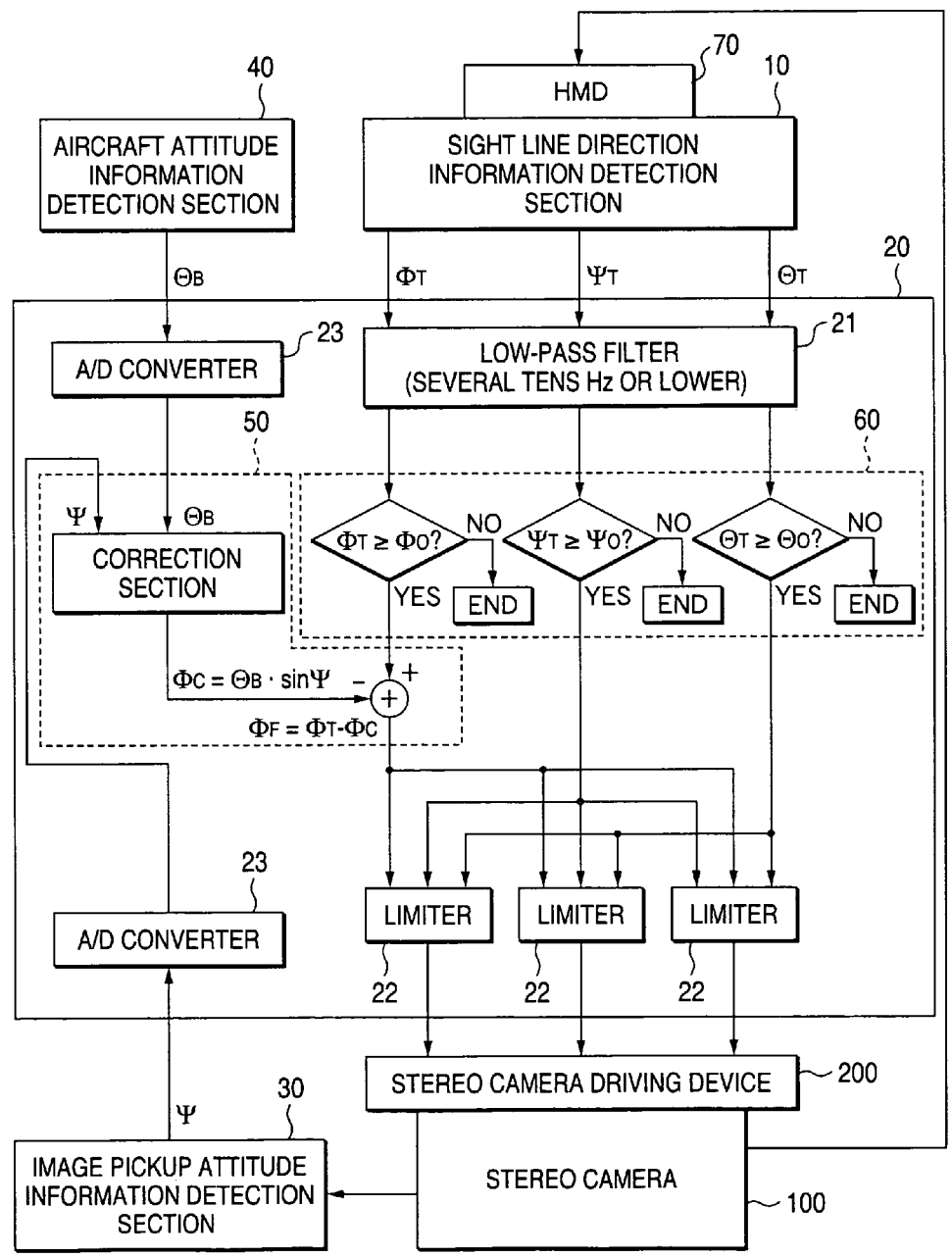
FIG. 1 is a block diagram describing a configuration of an image compensation apparatus according to an embodiment of the invention.
Figure 2:
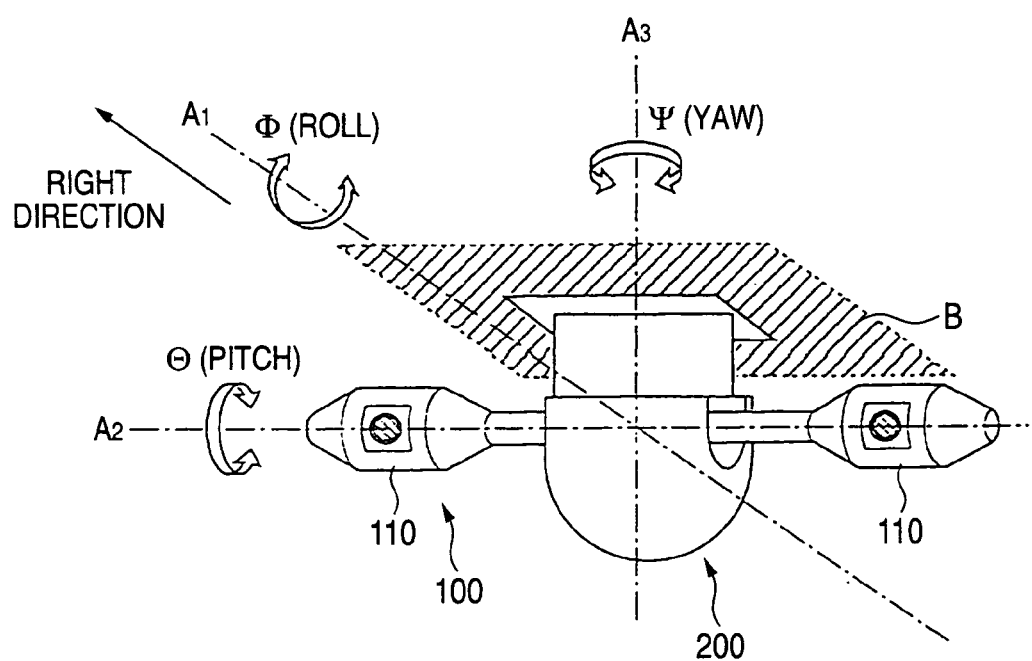
FIG. 2 is a schematic diagram of a stereo camera controlled by the image compensation apparatus shown in FIG. 1.

First, a configuration of the image compensation apparatus according to the embodiment will be described using FIGS. 1 and 2. FIG. 1 is a block diagram describing the configuration of the image compensation apparatus, and FIG. 2 is a schematic diagram of image pickup section (stereo camera 100) controlled by the image compensation apparatus shown in FIG. 1.

The image compensation apparatus is an apparatus for controlling an attitude of the stereo camera 100 (see FIG. 2) capable of rotating around a roll axis $A_1$, a pitch axis $A_2$ and a yaw axis $A_3$ orthogonal mutually. The stereo camera 100 is constructed of two cameras 110 placed at a predetermined spacing and is installed in the lower front of a fuselage B of an aircraft through a stereo camera driving device 200.

As shown in FIG. 1, the image compensation apparatus comprises sight line direction information detection section 10, a computation device 20, the stereo camera driving device 200, image pickup attitude information detection section 30, aircraft attitude information detection section 40, correction section 50, driving prevention section 60 and so on.

The sight line direction information detection section 10 is means for detecting information about a sight line direction of a pilot. In the embodiment, information (head roll angle information $\Phi_T$, head yaw angle information $\Psi_T$ and head pitch angle information $\Theta_T$) about an attitude of a head of the pilot is adopted as the "information about the sight line direction". The information about the attitude of the head of the pilot detected by the sight line direction information detection section 10 is outputted to the computation device 20.

The sight line direction information detection section 10 can be constructed of an HMD 70 mounted on the head of the pilot and a three-axis gyro sensor mounted in the fuselage. Further, the sight line direction information detection section 10 can be constructed of a sensor (a magnetic sensor, a light wave sensor, a super-sound wave sensor, etc.) mounted in the HMD 70 and signal (a magnetic signal, a light wave signal, a super-sound wave signal, etc.) generation section mounted in the aircraft.

The computation device 20 is a device for outputting a driving signal for rotating and driving the stereo camera 100 with reference to the information about the sight line direction detected by the sight line direction information detection section 10. The computation device 20 comprises a low-pass filter 21, limiters 22, A/D converters 23, the correction section 50, the driving prevention section 60 and so on.

The low-pass filter 21 is a filter for eliminating high-frequency noise by passing only a low-frequency portion (about several tens Hz or lower) of the information (head roll angle information $\Phi_T$, head yaw angle information $\Psi_T$ and head pitch angle information $\Theta_T$) detected by the sight line direction information detection section 10, and eliminates an influence of vibration of the fuselage.

The limiter 22 performs a function of limiting a rotational angle of the camera 110 in order to prevent the two cameras 110 of the stereo camera 100 from abutting on the fuselage B. By the limiters 22, a rotational angle (roll angle $\Phi$) around the roll axis $A_1$, a rotational angle (pitch angle $\Theta$) around the pitch axis $A_2$ and a rotational angle (yaw angle $\Psi$) around the yaw axis $A_3$ of the stereo camera 100 are limited to a range in which the stereo camera 100 does not abut on the fuselage B. Incidentally, ranges of these roll angle $\Phi$, pitch angle $\Theta$ and yaw angle $\Psi$ are determined by a mounting position of the stereo camera driving device 200 with respect to the fuselage B.

Incidentally, the case that the camera 110 of the right side with respect to a flight direction of the fuselage B inclines downward from a predetermined reference position is set to a roll angle of "plus", and the case that the two cameras 110 turn upward from a predetermined reference position is set to a pitch angle of "plus", and the case that the two cameras 110 turn rightward from a predetermined reference position is set to a yaw angle of "plus".

The stereo camera driving device 200 is a device for changing an attitude of the stereo camera 100 by rotating and driving the stereo camera 100 based on the driving signal outputted by the computation device 20. Incidentally, the computation device 20 and the stereo camera driving device 200 construct driving section in the invention.

The image pickup attitude information detection section 30 is means for detecting information about an attitude of the stereo camera 100. In the embodiment, yaw angle information $\Psi$ (a rotational angle around the yaw axis $A_3$) about the stereo camera 100 is adopted as the "information about an attitude of the stereo camera 100".

The aircraft attitude information detection section 40 is means for detecting information about an attitude of the aircraft. In the embodiment, pitch angle information $\Theta_B$ (an angle between a horizontal plane and a back-and-forth axis of the fuselage) about the fuselage is adopted as the "information about an attitude of the aircraft". An inertial device using gyro or a device using electromagnetic waves such as light or radio waves can be adopted as the image pickup attitude information detection section 30 and the aircraft attitude information detection section 40.

The correction section 50 is means for correcting the driving signal for rotating and driving the stereo camera 100 based on the information about an attitude of the stereo camera 100 (yaw angle information $\Psi$ about the stereo camera 100) and the information about an attitude of the aircraft (pitch angle information $\Theta_B$ about the fuselage) and is provided inside the computation device 20.

The correction section 50 in the embodiment calculates correction roll angle information $\Phi_F$ by calculating correction angle information $\Phi_C$ using the yaw angle information $\Psi$ about the stereo camera 100 and the pitch angle information $\Theta_B$ about the fuselage and subtracting this correction angle information $\Phi_C$ from the head roll angle information $\Phi_T$ detected by the sight line direction information detection section 10. That is, the following formula is obtained.

$$\Phi_F = \Phi_T - \Phi_C \quad (1)$$

Here, the correction angle information $\Phi_C$ is calculated by the following formula.

$$\Phi_C = \Theta_B \sin \Psi \quad (2)$$

Incidentally, the pitch angle information $\Theta_B$ about the fuselage and the yaw angle information $\Psi$ about the stereo camera 100 are converted into digital signals by the A/D converters 23.

The driving prevention section 60 is means for preventing rotation and driving of the stereo camera 100 when the information about a sight line direction detected by the sight line direction information detection section 10 does not reach a predetermined level, and is provided inside the computation device 20. In the case of making a description specifically, the driving prevention section 60 prevents an output of a driving signal to the stereo camera driving device 200 when absolute values of the head roll angle information $\Phi_T$, the head yaw angle information $\Psi_T$ and the head pitch angle information $\Theta_T$ detected by the sight line direction information detection section 10 are less than definition values $\Phi_0$, $\Psi_0$, $\Theta_0$ predefined.

Next, an attitude control action of the stereo camera 100 by the image compensation apparatus according to the embodiment will be described.

First, when a head of a pilot turns sideward, the sight line direction information detection section 10 detects information (head yaw angle information $\Psi_T$) about an attitude of the head of the pilot. The head yaw angle information $\Psi_T$ detected by the sight line direction information detection section 10 is outputted to the computation device 20 and reaches the driving prevention section 60 through the low-pass filter 21. When an absolute value of the head yaw angle information $\Psi_T$ is more than or equal to a definition value $\Psi_0$ in the driving prevention section 60, the head yaw angle information $\Psi_T$ is transmitted to the stereo camera driving device 200 through the limiter 22 as it is. On the other hand, when the absolute value of the head yaw angle information $\Psi_T$ is less than the definition value $\Psi_0$, the driving prevention section 60 prevents an output of a driving signal to the stereo camera driving device 200.

When the head yaw angle information $\Psi_T$ passing the driving prevention section 60 is inputted to the stereo camera driving device 200, the stereo camera driving device 200 rotates the stereo camera 100 around the yaw axis $A_3$ based on this head yaw angle information $\Psi_T$. When the stereo camera 100 rotates around the yaw axis $A_3$, the image pickup-attitude information detection section 30 detects yaw angle information $\Psi$ about the stereo camera 100. Then, the yaw angle information $\Psi$ detected by the image pickup attitude information detection section 30 is converted into a digital signal by the A/D converter 23 and thereafter is transmitted to the correction section 50 of the computation device 20.

When an aircraft performs pitching movement in a state in which the stereo camera 100 rotates around the yaw axis $A_3$ thus, the aircraft attitude information detection section 40 detects pitch angle information $\Theta_B$ about a fuselage. The pitch angle information $\Theta_B$ detected by the aircraft attitude information detection section 40 is transmitted to the correction section 50 of the computation device 20 through the A/D converter 23.

The correction section 50 calculates correction roll angle information $\Phi_F$ with reference to the yaw angle information $\Psi$ detected by the image pickup attitude information detection section 30 and the pitch angle information $\Theta_B$ detected by the aircraft attitude information detection section 40, and corrects a driving signal for rotating and driving the stereo camera 100.

For example, when head roll angle information $\Phi_T$ detected by the sight line direction information detection section. 10 is 0° (no inclination to the right and left) and the yaw angle information $\Psi$ detected by the image pickup attitude information detection section 30 is 30° (rightward) and the pitch angle information $\Theta_B$ detected by the aircraft attitude information detection section 40 is 30° (upward), the correction roll angle information $\Phi_F$ is calculated as the following formula using the formula (1) and formula (2) described above.

$$\Phi_F = \Phi_T - \Theta_B \sin \Psi = 0 - 30 \times \sin 30° = -15(°) \quad (3)$$

That is, the head roll angle information $\Phi_T$ detected is 0° and if this information $\Phi_T$ is inputted to the stereo camera driving device 200 as it is, a head roll $\Phi$ of the stereo camera 100 does not incline from a predetermined reference position but in the embodiment, the correction roll angle information $\Phi_F$ (−15°) calculated by the correction section 50 is inputted to the stereo camera driving device 200, so that the stereo camera 100 inclines 15° to the left side from the predetermined reference position. As a result of this, even when the aircraft performs the pitching movement, image information in which a roll axis hardly moves can be displayed.

In the image compensation apparatus according to the embodiment described above, by the correction section 50, a driving signal can be corrected with reference to the yaw angle information $\Psi$ about the stereo camera 100 detected by the image pickup attitude information detection section 30 and the pitch angle information $\Theta_B$ about the fuselage detected by the aircraft attitude information detection section 40.

That is, when the aircraft performs the pitching movement in a state in which a pilot turns toward the side temporarily and thereby the stereo camera 100 rotates around the yaw axis $A_3$ and shifts sideward, the amount of rotation and driving around the roll axis $A_1$ of the stereo camera 100 can be corrected by calculating the correction roll angle information $\Phi_F$ based on the yaw angle information $\Psi$ about the stereo camera 100 and the pitch angle information $\Theta_B$ about the fuselage. Therefore, the pilot does not have an illusion that the aircraft performs roll movement. As a result of this, a contradiction between image information obtained from the HMD 70 by the pilot and space information obtained from vestibular organs can be solved, so that the pilot can be prevented from getting travel-sick.

Further, in the image compensation apparatus according to the embodiment, rotation and driving of the stereo camera 100 can be prevented by the driving prevention section 60 when absolute values of information (the head roll angle information $\Phi_T$, the head yaw angle information $\Psi_T$ and the head pitch angle information $\Theta_T$) detected by the sight line direction information detection section 10 are less than definition values ($\Phi_0$, $\Psi_0$, $\Theta_0$) predefined. Therefore, when the pilot does not desire a change in image information, a situation in which the stereo camera 100 rotates and the image information changes due to variations in a sight line direction caused by vibration of the fuselage or resonance of a sensor can be prevented. As a result of this, stable image information can be provided for the pilot, so that the pilot does not have physiological discomfort including recognition of a feeling of fatigue.

Incidentally, in the embodiment described above, means for detecting information about an attitude of a head of a pilot is adopted as the sight line direction information detection section 10, but an eye camera for detecting movement of eyeballs of the pilot may also be adopted as the sight line direction information detection section 10.

Further, the aircraft in which the image compensation apparatus according to the invention is mounted is a manned aircraft at which a pilot boards, but a kind of its aircraft is not limited. That is, the image compensation apparatus according to the invention can be mounted in various manned aircraft such as a fixed-wing aircraft, a rotary-wing aircraft or an airship.

Further, the image compensation apparatus according to the invention can be applied to an aircraft for performing remote control above ground. For example, a ground operator wears a display such as the HMD 70 mounting the sight line direction information detection section 10 and devices other than this display are mounted in a fuselage and thereby operation can be performed.

According to the invention as claimed in aspect 1, by correction section, a driving signal can be corrected with reference to information about an attitude of image pickup section detected by image pickup attitude information detection section and information about an attitude of an aircraft detected by aircraft attitude information detection section. For example, when an aircraft performs pitching movement in a state in which a pilot turns toward the side temporarily and thereby the image pickup section shifts sideward; the amount of rotation and driving around a roll axis of the image pickup section can be corrected based on a yaw angle of the image pickup section and a pitch angle of the fuselage. As a result of this, image information can be displayed without producing an illusion that the aircraft performs roll movement, so that a contradiction between image information obtained by the pilot and space information obtained from vestibular organs can be solved and the pilot can be prevented from getting travel-sick.

According to the invention as claimed in aspect 4, there is provided driving prevention section for preventing rotation and driving of image pickup section when information about a sight line direction does not reach a predetermined level, so that when a pilot does not desire a change in visibility information; a situation in which the image, pickup section rotates and the image information changes due to variations in the sight line direction caused by vibration of a fuselage or resonance of a sensor can be prevented. Therefore, stable image information can be provided for the pilot, so that the pilot does not have physiological discomfort including recognition of a feeling of fatigue.

What is claimed is:

1. An image compensation apparatus for controlling an attitude of image pickup section which is mounted in an aircraft and is rotatable around a roll axis, a pitch axis and a yaw axis, comprising:
   sight line direction information detection section for detecting information about a sight line direction of a pilot,
   driving section which outputs a driving signal for rotating and driving the image pickup section with reference to the information about the sight line direction and rotates and drives the image pickup section based on the driving signal,
   image pickup attitude information detection section for detecting information about an attitude of the image pickup section,
   aircraft attitude information detection section for detecting information about an attitude of the aircraft, and
   correction section for correcting the driving signal with reference to the information about the attitude of the image pickup section and the information about the attitude of the aircraft.

2. The image compensation apparatus as claimed in claim 1, wherein
   the image pickup section is a stereo camera constructed of two cameras placed at a predetermined spacing.

3. The image compensation apparatus as claimed in claim 1, wherein
   the information about the attitude of the image pickup section is yaw angle information about the image pickup section,
   the information about the attitude of the aircraft is pitch angle information about a fuselage, and
   the correction section corrects a driving signal for rotating and driving the image pickup section around a roll axis.

4. The image compensation apparatus as in claim 1, further comprising:
   driving prevention section for preventing rotation and driving of the image pickup section when the information about the sight line direction does not reach a predetermined level.

* * * * *